United States Patent
Laurent et al.

(10) Patent No.: US 10,504,279 B2
(45) Date of Patent: Dec. 10, 2019

(54) VISIBILITY FUNCTION OF A THREE-DIMENSIONAL SCENE

(71) Applicant: Dassault Systemes, Velizy-Villacoublay (FR)

(72) Inventors: Gilles Laurent, Chatillon (FR); Cyril Delalandre, Chatillon (FR); Tamy Boubekeur, Paris (FR)

(73) Assignee: Dassault Systemes, Velizy-Villacoublay (FR)

(*) Notice: Subject to any disclaimer, the term of this patent is extended or adjusted under 35 U.S.C. 154(b) by 0 days.

(21) Appl. No.: 16/232,799

(22) Filed: Dec. 26, 2018

(65) Prior Publication Data

US 2019/0197763 A1 Jun. 27, 2019

(30) Foreign Application Priority Data

Dec. 24, 2017 (EP) .................................. 17306930

(51) Int. Cl.
*G06T 15/40* (2011.01)
*G06F 7/57* (2006.01)
(Continued)

(52) U.S. Cl.
CPC ............... *G06T 15/40* (2013.01); *G06F 7/57* (2013.01); *G06F 17/16* (2013.01); *G06T 1/20* (2013.01);
(Continued)

(58) Field of Classification Search
CPC .......... G06T 15/40; G06T 15/06; G06T 15/08
See application file for complete search history.

(56) References Cited

U.S. PATENT DOCUMENTS 7,567,248 B1 * 7/2009 Mark ...................... G06T 11/40
345/426
8,952,963 B1 * 2/2015 Zimmerman ............. G06T 1/60
345/419
(Continued)

FOREIGN PATENT DOCUMENTS

EP 2 590 142 A1 5/2013

OTHER PUBLICATIONS

Extended European Search Report dated Jun. 28, 2018, in European Application No. 17306930.3.
(Continued)

*Primary Examiner* — Phi Hoang
(74) *Attorney, Agent, or Firm* — Oblon, McClelland, Maier & Neustadt, L.L.P.

(57) ABSTRACT

The disclosure notably relates to a computer-implemented method of computing a visibility function of a 3D scene. The method includes obtaining a set of directions ($\vec{\omega}$) in the 3D scene, computing a set of lines that are parallel to the direction, for each computed set of lines, sampling the lines of the set into spatial segments, associating each line of a set with a bit field, each spatial segment of the line corresponding to a bit of the bit field, superimposing the set of lines and the 3D scene, when a spatial segment of a line intersects a geometry in the 3D scene, marking the bit, corresponding to the spatial segment of the bit field, associated with the line, obtaining two points in the 3D scene, identifying spatial segments having a closest alignment with the query segment, computing the visibility of the query segment by performing a logical bit operation.

20 Claims, 6 Drawing Sheets

(51) Int. Cl.
*G06F 17/16* (2006.01)
*G06T 1/20* (2006.01)
*G06T 1/60* (2006.01)
*G06T 15/08* (2011.01)

(52) U.S. Cl.
CPC ............... *G06T 1/60* (2013.01); *G06T 15/08* (2013.01); *G06T 2210/21* (2013.01)

(56) References Cited

U.S. PATENT DOCUMENTS

| | | | | |
|---|---|---|---|---|
| 2007/0024615 | A1* | 2/2007 | Keller | G06T 15/06 345/421 |
| 2009/0187385 | A1 | 7/2009 | Zegdoun et al. | |
| 2009/0262132 | A1* | 10/2009 | Peterson | G06T 15/005 345/619 |
| 2016/0110910 | A1* | 4/2016 | Obert | G06T 15/005 345/426 |
| 2017/0330353 | A1* | 11/2017 | Natsuaki | G06T 11/003 |
| 2018/0276857 | A1* | 9/2018 | Hendrey | G06F 16/29 |

OTHER PUBLICATIONS

Balazs Csebfalvi, et al., "Fast Surface Rendering of Volumetric Data", Feb. 7, 2000, pp. 1-8, https://pdfs.semanticscholar.org/b859/f888b2a074e034dacf3c5659c7bcfb5f2a42.pdf.

Benjamin Eikel, et al., "Spherical Visibility Sampling", Eurographics Symposium on Rendering, vol. 32, No. 4, 2013, pp. 49-58.

Jean-Mark Hasenfratz, et al., "A survey of Real-Time Soft Shadows Algorithms", Computer Graphics Forum, Wiley, vol. 22, No. 4, 2003, pp. 753-774.

P. Ganestam, et al., "Bonsai: Rapid Bounding Volume Hierarchy Generation using Mini Trees", Journal of Computer Graphics Techniques, vol. 4, No. 3, 2015, pp. 23-42.

Thomas Engelhardt and Carsten Dachsbacher, "Octahedron Environment Maps", VMV, 2008: pp. 1-6, https://pdfs.semanticscholar.org/fcb9/a6dbdf7b4c31f94e481cf101c83b73ea6410.pdf.

Johannes Kopf, et al., "Joint Bilateral Upsampling", ACM Transactions on Graphics, vol. 26, No. 3, 2007, pp. 1-5.

Ola Olsson, et al., "Clustered deferred and forward shading", Proceedings of the Fourth ACM SIGGRAPH/Eurographics conference on High-Performance Graphics, Jun. 25-27, 2012, pp. 87-96.

* cited by examiner

D  0 0 0 0 0 0 1 0 0 0 1 0 0 0 0 0 0 0 1 0 0 0 0 0 0 0

D    0 0 0 0 0 0 1 0 0 0 1 0 0 0 0 0 0 0 1 0 0 0 0 0 0 0
X    0 0 1 0 0 0 0 0 0 0 0 0 0 0 0 0 0 0 0 0 0 0 0 0 0 0
Y    0 0 0 0 0 0 0 0 0 0 0 0 0 1 0 0 0 0 0 0 0 0 0 0 0 0

D     0 0 0 0 0 0 1 0 0 0 1 0 0 0 0 0 0 0 1 0 0 0 0 0 0 0
X-1   1 1 0 0 0 0 0 0 0 0 0 0 0 0 0 0 0 0 0 0 0 0 0 0 0 0
Y-1   1 1 1 1 1 1 1 1 1 1 1 1 1 0 0 0 0 0 0 0 0 0 0 0 0 0

U.S. 10,504,279 B2

VISIBILITY FUNCTION OF A THREE-DIMENSIONAL SCENE

CROSS-REFERENCE TO RELATED APPLICATIONS

This application claims priority under 35 U.S.C. § 119 or 365 to European Application No. 17306930.3, filed Dec. 24, 2017. The entire contents of the above application(s) are incorporated herein by reference.

FIELD OF THE INVENTION

The invention relates to the field of computer programs and systems, and more specifically to a method, system and program of computing of a visibility function of a three-dimensional (3D) scene.

BACKGROUND

Realism in modern rendering applications induces more and more requirements in terms of image quality, coming with a whole range of critical issues, especially for real-time scenarios. Real time scenarios comprise real time rendering of a scene. "Real time" refers to a technique that could be executed in a few milliseconds (in general less than 100 ms) on an existing hardware. A "scene" is a set of geometries, materials, lights and cameras that define the rendering. Residing at the heart of most questions related to real time approximate solutions to the rendering equation, a general efficient visibility query mechanism remains one of the most critical components of a real time rendering engine. A general efficient visibility query mechanism requires to have a "global visibility" function that is the function that takes a pair of points in the space and returns true if and only if there exists exist geometry in the scene that intersects the segment formed by these two points. A "visibility query" is the evaluation of the global visibility function for two given points.

Several existing techniques, which aim at addressing the global visibility computation problem in real time scenarios are now discussed. Most of them a based on raymarching technique. Raymarching is a technique that aims at computing the intersection of a ray and the scene and works as follows. Ray marking requires a data structure that is able to, both, sample the scene and provide an efficient mechanism to compute the trace of a segment, i.e. the set of samples in the data structure that possibly intersect the segment. A sample is an element of this data structure and contains a set of descriptors, associated to this sample, which allows to build a local reconstruction scene; the local reconstruction is not necessarily exact.

The algorithm operates as follow. First, the scene is sampled in the data structure. Then, a visibility query is triggered: for each pair of points, the trace of the segment is computed, and for each sample in the trace, an intersection test between the segment and a reconstruction of the scene is computed using the corresponding descriptors. Next, a value is returned that is function of all intersection tests (often the distance of the first intersection).

However, the known solutions that rely on raymarching technique suffer several drawbacks. Despite the growing computational power offered by today's hardware, traditional approaches do not always naturally fit with renewed architecture perspectives, often failing at exploiting their entire computation capabilities or are restricted to very specific use, such as single view visibility determination. In addition, the data structures the traditional approaches rely on, involve numerous memory accesses when the visibility function is executed; notably, these data structures comprise many pointers. However, memory accesses increase the execution times of the visibility function, which is critical for real-time rendering.

Within this context, there is still a need for an improved method of computing of a visibility function of a three-dimensional scene.

SUMMARY OF THE INVENTION

It is therefore provided a computer-implemented method of computing of a visibility function of a three-dimensional (3D) scene. The method comprises:

providing a set of directions ($\vec{\omega}$) in the 3D scene;
for each direction of the set, computing a set of lines that are parallel to the direction;
for each computed set of lines, sampling the lines of the set into spatial segments;
associating each line of a set with a bit field, each spatial segment of the line corresponding to a bit of the bit field;
superimposing the set of lines and the 3D scene;
when a spatial segment of a line intersects a geometry in the 3D scene, marking the bit corresponding to the spatial segment of the bit field associated with the line;
providing two points in the 3D scene that define a query segment;
identifying one or more spatial segments having a closest alignment with the query segment;
computing the visibility of the query segment by performing a logical bit operation on one or more bit fields of the lines the identified one or more spatial segments belong to.

The method may comprise one or more of the following:

performing a logical bit operation comprises performing a logical bit for a segment [X Y] by computing a function R=(X−1) NAND (Y−1) AND D, where:
X is one or more of the bitfield set to 1 at one of the two points of the query segment and 0 everywhere else;
Y is one or more of the bitfield set to 1 at the other one of the two points of the query segment and 0 everywhere else;
D is one or more bit fields of the lines the identified one or more spatial segments belong to;
providing a set of directions in the 3D scene comprises quantizing a parametrization of a unit hemisphere ($\mathcal{H}$);
quantizing a parametrization of a unit hemisphere ($\mathcal{H}$) comprises performing an octahedral mapping of the hemisphere;
the parallel lines computed for a direction ($\vec{\omega}$) are computed from a grid on a plane that is orthogonal to the direction;
the grid on the plane is a regular grid and wherein the grid is the same for each plane orthogonal to each direction;
computing, for each plane, local basis for defining the position of the grid on the plane, the local basis comprising a first vector that is obtained from the direction ($\vec{\omega}$), a second vector ($\vec{e_u}$) and third vector ($\vec{e_v}$) that are the local basis of the plane;
the second vector ($\vec{e_u}$) and the third vector ($\vec{e_v}$) are continuous dependence on the direction ($\vec{\omega}$);

the continuous dependence on the direction ($\vec{\omega}$) is given by:

$$\forall \vec{\omega} = (x, y, z) \in \mathcal{H}, \text{ ie, } x^2 + y^2 + z^2 = 1 \text{ and } z \geq 0$$

$$\mathcal{F}(\vec{\omega}) = (\vec{e_w}, \vec{e_v}) = \left( \begin{pmatrix} 1 - \dfrac{x^2}{1+z} \\ \dfrac{-xy}{1+z} \\ -x \end{pmatrix}, \begin{pmatrix} \dfrac{-xy}{1+z} \\ 1 - \dfrac{y^2}{1+z} \\ -y \end{pmatrix} \right)$$

where $\mathcal{H}$ is a unit hemisphere;

$\mathcal{F}$ defines a tangential space for a given direction ($\vec{\omega}$); (x,y,z) are coordinates in the basis of the unit hemisphere; identifying one or more spatial segments having a closest alignment with the query segment comprises —determining a closest direction among the set of directions; —determining the plane associated with the determined closest direction; —projecting the query segment on the determined plane; —determining the closest lines to the projected query segment;

each line of a computed set of lines of a provided direction is a pixel on the plane that is orthogonal to the direction, the set of lines of the provided direction forming a grid of pixels on the plane, and wherein determining the closest lines to the projected query segment comprises determining the pixels of the plane that are intersected by the projected query segment, projected query segment forming a set of contiguous pixels on the plane;

determining the closest direction among the set of directions comprises computing a direction of the query segment and computing the position of the segment in the parametrization of the unit hemisphere ($\mathcal{H}$), selecting a direction among the set of directions which is the closest to the position of the segment in the parametrization of the unit hemisphere ($\mathcal{H}$);

before providing a query segment: —subdividing the viewport in a set of superpixels, a superpixel being a group of contiguous pixels of the viewport; —for each superpixel, computing one nor more clusters of pixels of the superpixel, each computed cluster comprising pixels having one common pixel parameter; —for each cluster, computing a sample that represents an average value of at least one parameter of the pixels of the cluster, and adding a reference of the computed sample to the superpixel from which the duster has been computed; and further comprising, after the computation of the visibility of the segment query: —reconstructing the final image for every pixels of the viewport by computing, for each pixel of the viewport, a weighted sum of all the samples of the superpixel the pixel belongs to.

It is further provided a computer program comprising instructions for performing the method.

It is further provided a computer readable storage medium having recorded thereon the computer program.

It is further provided a system comprising a processor coupled to a graphical card with a graphic processing unit, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
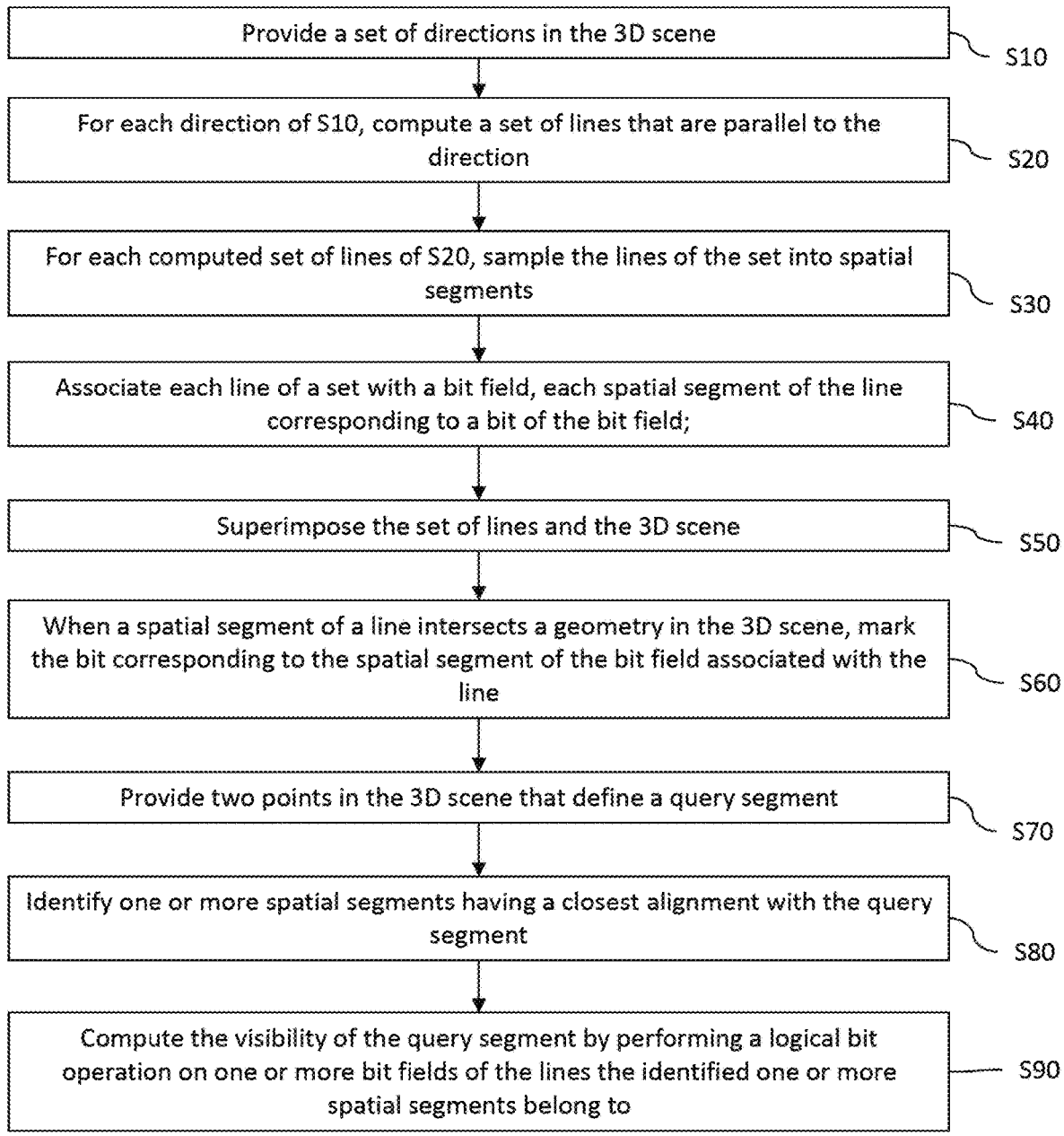
FIG. 1 shows a flowchart of an example of the method.

With reference to the flowchart of FIG. 1, it is proposed a computer-implemented method of computing of a visibility function of a three-dimensional (3D) scene. A visibility function is a function that takes a pair of points in the space and returns true if and only if there exists exist geometry in the scene that intersects the segment formed by these two points. The method first performs a voxelization in all directions. The voxelization is the process of generating the set of voxels, where voxels are set of volume elements that stores descriptors of the underlying scene. This is achieved by providing a set of directions in the 3D scene. Then, for each direction of the set, a set of lines is computed; the lines of the set are parallel to the direction. Next, for each computed set of lines, the lines of the set are sampled into spatial segments. Each line of a set of lines is associated with a bit field; Each spatial segment of the line corresponds to a bit of the bit field. Then, the set of lines and the 3D scene are superimposed. When a spatial segment of a line intersects a geometry in the 3D scene, the bit corresponding to the spatial segment of the bit field associated with the line is marked. The method then performs a visibility query. Two points are provided in the 3D scene. The two points define a query segment. One or more spatial segments are identified; the identified spatial segments have a closest alignment with the query segment. The visibility of the query segment is computed by performing a logical bit operation on one or more bit fields of the lines the identified one or more spatial segments belong to.

Such a method improves the computation of a visibility function of a three-dimensional (3D) scene. Notably, the method provides an approximate yet efficient point-to-point visibility model adapted to fine-grained parallel graphics architectures. Indeed, the method is based on a set of coarse voxelizations computed in real time along many quantized directions defined in a suitable parameterization. The quantization is performed for an hemisphere only, which avoids redundancy of information and this decreases the size of the data structure, and as a consequence the access times on the data structure are decreased too. A visibility query can be achieved in a few constant time by realizing a minimal number of ray-marching steps, contrasting with standard approaches that may have arbitrary long ones. The method can be efficient method on several applications, including soft shadows, ambient occlusion and image-based lighting, without any precomputation.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory, the memory having recorded thereon a computer program comprising instructions for performing the method. The memory may also store a database. The memory is any hardware adapted for such storage, possibly comprising several physical distinct parts (e.g. one for the program, and possibly one for the database). The database may store the 3D scene for which the visibility function is computed, e.g. the database stores the set of triangles of the scene. The memory may store the data structure computed by the method, e.g. the result of the voxelization in all directions.

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally computed a visibility function of a 3D scene. The 3D scene may comprise modeled objects. A modeled object is any object defined by data stored, e.g. in the database. By extension, the expression "modeled object" designates the data itself. According to the type of the system, the modeled objects may be defined by different kinds of data. The system may indeed be, but is not limited to, any combination of a CAD system, a CAE system, a CAM system. By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 2:
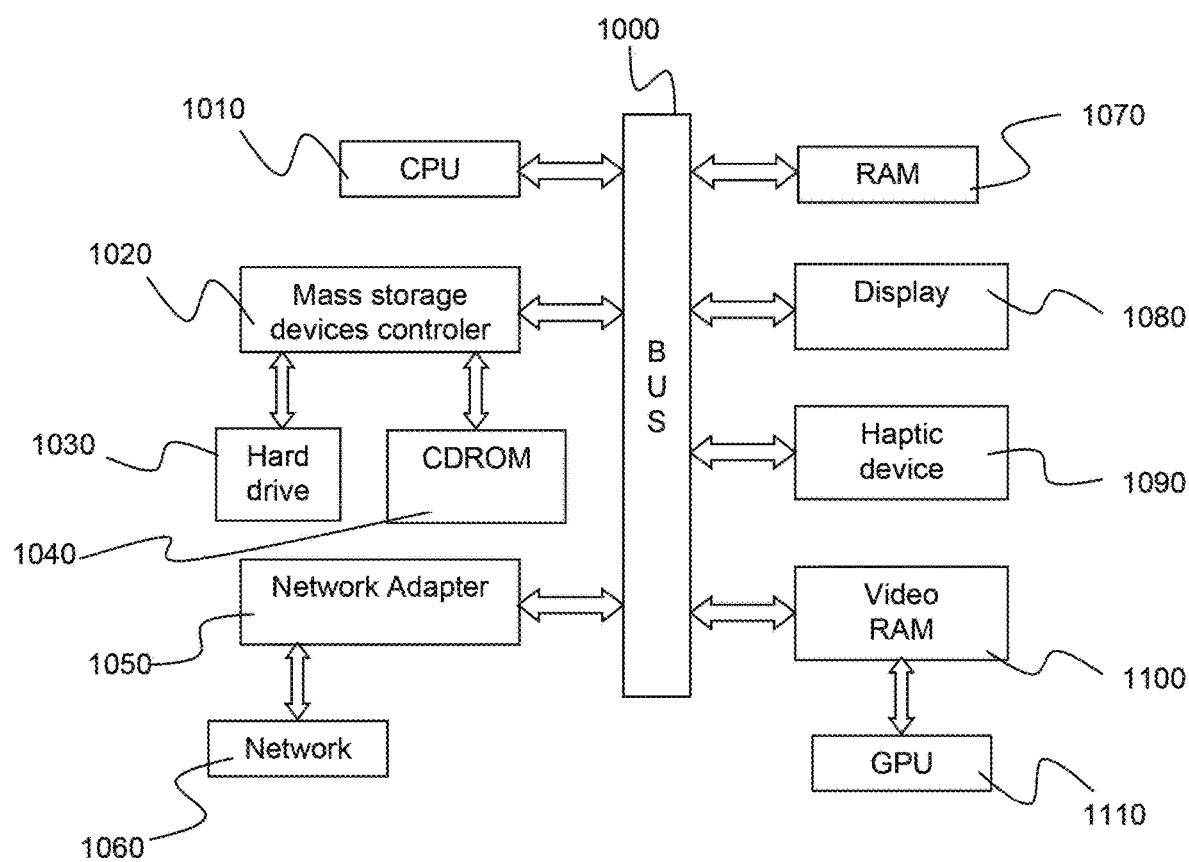
FIG. 2 shows an example of a system for performing examples of the method.

FIG. 2 shows an example of the system, wherein the system is a client computer system, e.g. a workstation of a user used for rendering in real time a 3D scene.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring now to FIG. 1, it is discussed an example of the method for computing a visibility function of a 3D scene. The visibility function is the function that takes a pair of points in the space and returns true if and only if there exists exist geometry in the scene that intersects the segment formed by these two points.

At step S10, a set of directions is provided in the three-dimensional (3D) scene. This is performed by the system that computes the directions. A direction is inferred with respect to a reference frame of the 3D scene, and may be represented by a direction vector. The reference frame of the 3D scene is used for computing positions and/or orientation of the objects of the 3D scene, as known in the art. An example of providing a set of directions will be discussed hereinbelow.

A scene generally comprises a set of objects such as geometries, materials, lights and cameras. The scene is three-dimensional, which means that the objects are located in a 3D space—the position of an object is determined by three parameters—. In examples, the 3D scene may be a three-dimensional Euclidean space. In examples, the 3D scene may comprise a set of triangles and one or more direct light sources.

In examples, the raw data of the 3D scene (at least the set of triangles) may be provided together with the set of directions. The raw data of the 3D scene can be accessed by the system and/or the program implementing the examples of the method of the present disclosure. In examples, the 3D scene can be loaded in a Render Engine that is a framework that generates images to be displayed upon application's request, as known in the art. For instance, a CAD application of a CAD system provides to the Render Engine a 3D scene of 3D modeled objects as input and the Render Engine draws the 3D scene to the screen with the use of one or more Graphic Cards of the CAD system. The triangles of the 3D scene form a mesh, e.g. modeled objects of the 3D scene are represented by interconnected triangles, as known in the art.

In examples, the set of directions may be provided in an empty 3D scene (that is, a 3D scene without nay raw data).

It is now discussed an example of providing a set of directions (S10). A unit hemisphere is provided in the 3D scene. The hemisphere is unit, which means that a vector extending from the center of a sphere from which the hemisphere—a half of the sphere—is obtained to any point that belongs to the surface of the hemisphere is a normed vector of length 1. The unit hemisphere is thus used to specify spatial directions in 3D scene, and each unique direction is equivalent numerically to a point on the unit sphere. The unit hemisphere may be located at the center of the 3D scene, which means that the center of the sphere from which the hemisphere is obtained is located at the center of the 3D scene.

Once provided, the unit hemisphere is parametrized. The parametrization is performed as known in the art; the hemispherical parametrization is similar to a spherical parameterization. In an example, the parametrization comprises performing an octahedral mapping of the hemisphere. The use of an octahedron mapping allows mapping (a, b)$\in[-1, 1]^2$ to the hemisphere without excessive distortion, while maintained efficient random access of the data structure that is computed during the process of voxelization in all directions. Then, the parametrization of hemisphere is quantized. Values (a, b) represent two-dimensional (2D) coordinates on the projection place of the octahedron are selected. This amounts to say that coordinates are selected on the 2D projection plane of the octahedron. Each selected coordinate (a, b) corresponds to a direction (noted $\vec{\omega}$) in the 3D scene that is represented by normed vector of length 1 of the unit hemisphere.

Figures 15, 16, 17:
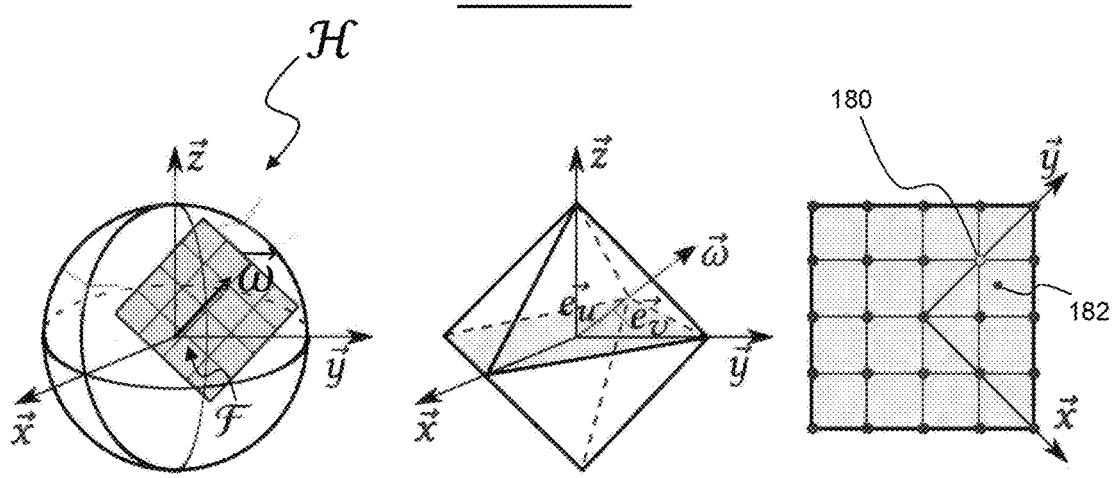
FIGS. 15, 16 and 17 shows an example of space parameterization.

FIGS. 15 to 17 illustrate the above-discussed example where a set of directions is provided by quantizing a parametrization of a unit hemisphere ($\mathcal{H}$) using an octahedral mapping of the hemisphere. For the sake of clarity of the FIGS. 15 to 17, a unit sphere is represented instead of a unit hemisphere. It is to be understood that the set of directions in the 3D scene might be provided by quantizing a parametrization of a unit sphere instead of a unit hemisphere; the use of the hemisphere avoids redundancy of computation as computing an opposite direction from a known direction is straight forward.

FIG. 15 illustrates an example of a unit (hemi)sphere ($\mathcal{H}$) with a given direction $\vec{\omega}$.

FIG. 16 illustrates an example of the octahedral parameterization of the upper hemisphere ($\mathcal{H}$).

FIG. 17 illustrates an example of the quantized directions that correspond to the dots in the projection plane, e.g. the dot 180. Thus, a 2D map of directions is provided. In this example, the set of quantized directions forms a regular grid so that the distribution of the directions on the hemisphere is regular. For the sake of clarity of the figure, the number of points representing the direction is limited. The number of directions is preferably comprised between 64 and 1024, boundary included; being understood that the greater the number of directions, the more precise will be the voxelization. Hence, the number of direction can be larger than 1024, e.g. 2048, 4096, . . . .

Referring back to FIG. 1, a set of lines is computed (S20) for each provided (or computed) direction. The line of a set of line are parallel to a given direction. Parallel means that every point on a first line of the set is located at exactly the same minimum Euclidian distance from a second line of the set.

In examples, the computation by the system of the sets of lines of the directions may be performed by computing, for each direction ($\vec{\omega}$), a plane that is orthogonal to the direction. The lines of the set of lines are orthogonal to this plane. The plane may comprise a grid that defines a set of locations on the plane through which the computed lines of the set pass; in practice one line for one location.

In examples, the grid of a plane is a regular grid. Using a regular grid makes easier the computation of the location and of the lines passing through the locations as well.

In examples, the grid is identical for all the planes associated with the directions. For instance, the pitch of the grids is the same for all the grids.

Back to FIG. 15, a tangential space ($\mathcal{F}$) to the hemisphere ($\mathcal{H}$) is computed for a given direction $\vec{\omega}$. The tangential space ($\mathcal{F}$) is orthogonal to the given direction and a regular grid is computed on this space; thus, a plane with a regular grid is provided. A set of parallel lines all orthogonal to ($\mathcal{F}$) is computed: each line passes through a location of the grid. As it will be explained below, a voxelization of the scene aligned to ($\mathcal{F}$) can be computed. The size of the grid may be selected so that a voxelization of all the geometries of the 3D the scene can be carried out.

The use of tangential spaces $\mathcal{F}$ that are orthogonal to the given direction has an infinity of positions and may introduce distortions at the time of a visibility query (S70-S90). However, there is no unique and trivial solution to the definition of $\mathcal{F}$. The following shows how to minimize this problem of distortions.

In examples, each plane comprises a local basis for defining the position of the grid on the plane. The local basis that defines the position of the grid comprises three vectors. A first vector is obtained from the direction ($\vec{\omega}$), a second vector ($\vec{e_u}$) and third vector ($\vec{e_v}$) are the local basis of the plane. The local basis that defines the position of the grid on the plane is preferably an orthonormal coordinate system. The orientation of the grid of any plan can now be identified.

In examples, the second vector ($\vec{e_u}$) and the third vector ($\vec{e_v}$) are continuous dependence on the direction ($\vec{\omega}$). That is to say, for each direction $\vec{\omega} \in \mathcal{H}$, a continuous orthogonal frame $\mathcal{F}(\vec{\omega})=(\vec{e_u}, \vec{e_v})$ is defined. The continuous orthogonal frame is equal to the identity for the north pole and is constant relative to the sphere along the meridians. The frame that is used we propose comes from the application which identifies with the canonical basis when $\omega$ is equal to the north pole and which for any $\omega$ value different from the poles applies the rotation parallel to the meridian passing through the north pole and $\omega$, sending the north pole on $\omega$. Hence, the grids of the planes have a continuous variation on the hemisphere when passing from a first direction to a second direction that is a neighbor of the first one.

In examples, the continuous dependence on the direction ($\vec{\omega}$) of the second vector ($\vec{e_u}$) and the third vector ($\vec{e_v}$) is given by the following parametrization:

$$\forall \vec{\omega}=(x,y,z) \in \mathcal{H}, \text{i.e. } x^2+y^2+z^2=1 \text{ and } z \geq 0$$

$$\mathcal{F}(\vec{\omega}) = (\vec{e_u}, \vec{e_v}) = \left( \begin{pmatrix} 1-\dfrac{x^2}{1+z} \\ \dfrac{-xy}{1+z} \\ -x \end{pmatrix}, \begin{pmatrix} \dfrac{-xy}{1+z} \\ 1-\dfrac{y^2}{1+z} \\ -y \end{pmatrix} \right)$$

where $\mathcal{H}$ is a unit hemisphere, $\mathcal{F}$ defines a tangential space for a given direction ($\vec{\omega}$), (x,y,z) are coordinates in the basis of the unit hemisphere. Therefore, each line computed (S20) can be identified in space with four components ((a,b),(u,v))$\in[-1,1]^2 \times \mathbb{R}^2$ where (a,b) defines a direction $\vec{\omega}$ and (u,v) a position in the corresponding frame $\mathcal{F}(\vec{\omega})$.

Referring back to FIG. 1, the computed lines are sampled (S30). Said otherwise, each line of each set of lines is sub-divided into several segments that are called spatial segments. This operation of computing spatial segment is performed as known in the art.

Then, at step S40, each line of each set of lines is associated with a bit field, and each spatial segment of said each line corresponds to a bit of the bit field. A bit field is a data structure that is stored in a memory. A bit field comprises a number of adjacent computer memory locations which have been allocated to hold a sequence of bits. Associating a line to a bit filed means that the system performing the method is able to identify in the memory the sequence of bits (that is, the bit field) of a given line. The association is performed as known in the art, e.g. by use of pointers.

Then, the set of lines and the 3D scene are superimposed (S50). The lines having being sampled, this amounts to say that the spatial segments of the lines of the sets of lines are superimposed with the 3D scene. Superimposing the lines of the sets and the 3D scenes involves that the raw data of the set of triangles of the 3D and the raw data of the spatial segments are all together in the 3D scene. Thus, computations steps that involve both raw data can be performed now.

Next, the system determines the intersection between geometries in the 3D scene and the spatial segments. The determination of the intersections is performed as known in the art. When an intersection between a spatial segment and a geometry in the 3D scene is determined (that is, the intersection is computed), the bit corresponding to the spatial segment is marked (S60). The bit fields of the lines of the sets of lines that intersect are thus marked. Marking a bit (and by extension a bit field) means that a value of a bit is set, e.g. added or modified; in practice, all the bits of a bit field are associated with a value as an "empty" bit does not exist in the memories as known in the art, e.g. a bit field associated to a line is initialized with a value "0" for each bit.

Figure 3:
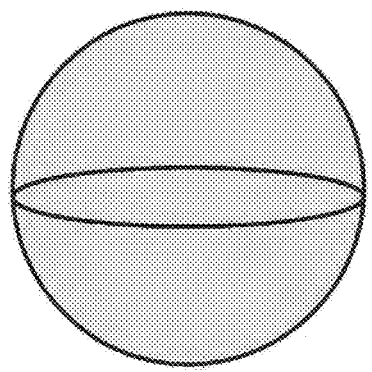
FIGS. 3, 4, 5, 6, 7 and 8 show an example of steps S10 to S80 of FIG. 1.
Figure 4:
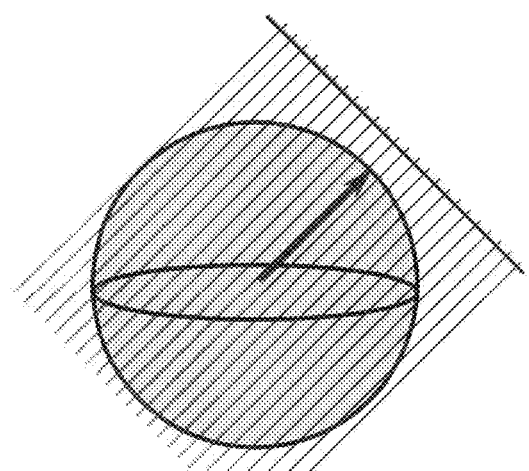

FIGS. 3 to 6 illustrate an example of parametrization and voxelization of a 3D scene as discussed in relation to S10 to S60 of FIG. 1. Based on a set of coarse voxelizations computed in real time along many quantized directions defined in a suitable parameterization, a set of maps is obtained, where a map represents a voxelization along one of the directions. Hence, for each direction, an orthographic map perpendicular to this direction is created, and each pixel of the map correspond to a one-dimensional line. FIG. 3 shows the unit (hemi)sphere that is used for providing (that is, for computing) a set of directions in the 3D scene. FIG.

Figure 5:
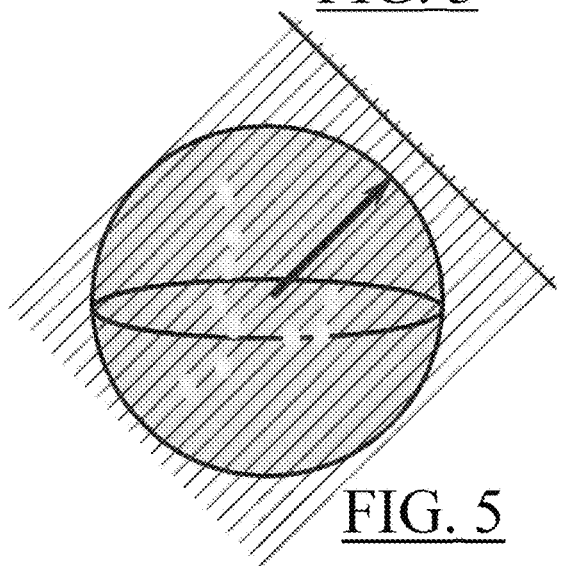
Figure 6:
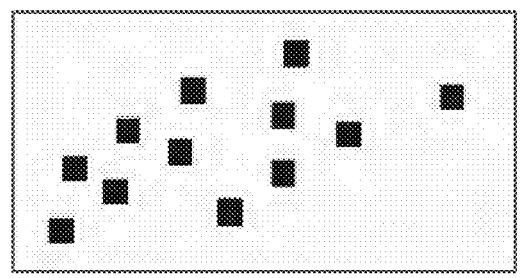

4 illustrates the computation of a set of lines for one direction that is represented by the arrow. A plane with a regular grid is provided orthogonal to the direction, and a line parallel to the direction is computed for each location provided by the grid. FIG. 5 illustrates the superimposition of the set of parallel lines of one direction with the 3D scene. Several intersections are detected and represented on the figure with dots; the detection is the result of intersections computations. FIG. 6 illustrates an example of a voxelization of the 3D scene stored as a compact bit field representation. Each square (also referred to as pixel) on the map represents the bit field of the line intersecting a geometry of the 3D scene. Thus, based on the above-discussed parametrization, a set of maps is built on-the-fly. A map is computed in two steps: (i) using the octahedral projection, a set of directions is quantized, aligned with a regular grid in the projection plane; (ii) for each of these directions, a voxelization of the scene is computed, aligned with our frame parameterization $\mathcal{F}$ storing it as a compact bit field representation.

Back to FIG. 1, it is now discussed an example of a visibility query (S70-S90).

At step S70, a query segment is provided in the 3D. Given a segment in 3D space, the visibility function determines whether this segment is intersected by geometry or not. The segment is defined (and delimited) by two points in the 3D space.

Then, at step S80, one or more spatial segments having a closest alignment with the query segment, are identified. The expression "closest alignment" involves that the identified one or more spatial segments have the best direction matches with the direction of the query segment. Two directions are close if the angle between these two directions is very small.

In examples, the identification of the one or more spatial segments may comprises the determination of the line among the set of lines having the closest direction to the direction of the query segment.

In examples, the identification of the line among the lines of the sets of lines that has the closest direction among the set of directions may be performed by determining the quantized direction that is best aligned with the query segment using octahedral projection of the query segment and fetching the nearest voxelization in this mapping. In this case, the quantized direction that is the best aligned with the parameterized query segment is the one with the smallest distance on the 2D map of directions. This is illustrated on FIG. 17 where the dot 180 (representing one direction) is the closest to the dot 182 that represents the direction of the query segment. Here the distance is an Euclidian distance, being understood that any type of distance may be used. Therefore, once the direction of the query segment in the 3D scene has been obtained (e.g. upon computation), the position of the query segment in the parametrization of the unit hemisphere ($\mathcal{H}$) is computed, and the direction among the set of directions which is the closest to the position of the segment in the parametrization of the unit hemisphere ($\mathcal{H}$), is selected.

Once the line among the set of lines having the closest direction to the direction of the query segment is determined—for instance by measuring a distance in the parameterization of the unit hemisphere—, the plane associated with this closest direction is retrieved. This is performed as known in the art, e.g. a pointer maintains a link between a line and stored data of the plane.

Figure 7:
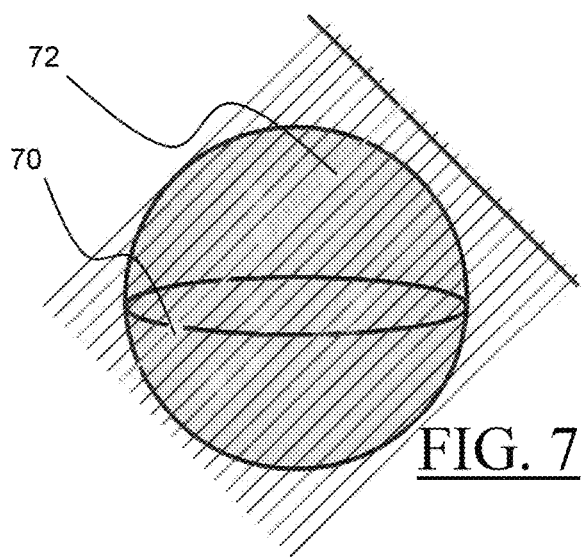
Figure 8:
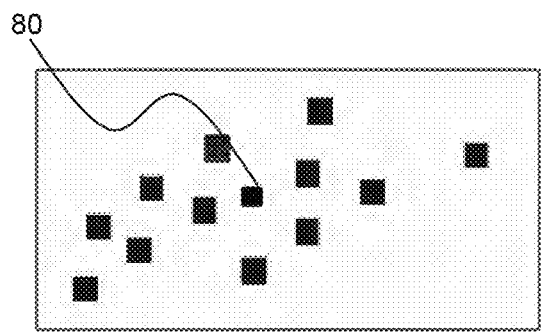

Then, the query segment is projected on the plane that is associated with the line having the closest direction to the direction of the query segment. The projection of the query segment on the plane is an orthogonal projection. FIG. 7 is identical to FIG. 5, except two points 70, 72 that define a query segment in the 3D scene are now represented. In this example, the query segment is parallel to the direction associated to the plane. FIG. 8 shows the projection 80 of the query segment on the map representing the voxelization of the 3D scene for a direction. In this example, the query segment being parallel to the direction, the orthogonal projection of the query segment produces only one pixel. In the event the query segment is not parallel to the direction associated with the plane, the projected query segment would form a set of contiguous pixels on the map.

Then, the closest lines to the projected query segment are determined. The determination is performed based on the distances between the pixel representing the query segment and the pixels representing the lines intersecting a geometry of the 3D scene. Here the distance may be an Euclidian distance. One line may be used. More than one line can be chosen to average the lines and reduce visual artifacts at the border between two directions.

Back to FIG. 1, the visibility of the query segment is computed. The computation is carried out by performing a logical bit operation on the one or more bit fields of the lines the identified one or more spatial segments (those having the closest alignment with the query segment) belong to. The query segment is conservatively raymarched and, using logical bit operations, the bit fields corresponding to the spatial segments crossing the query segment are tested against the bits of the one or more spatial segments identified as having the closest alignment with the query segment. It is to be understood that the bits of the one or more spatial segments identified as having the closest alignment with the query segment are fetched from the map representing the voxelization of the 3D scene for a direction. The plane is almost orthogonal to the query segment as the plane is associated with a direction having a closest alignment. Thus, the ray marching leads to a very small number of steps. Moreover, the whole query if fined-grained parallel scalable.

In examples, the logical bit operation that is performed for a segment [X Y] comprises computing a logical operation R=(X−1) NAND (Y−1) AND D, where:

X is one or more of the bitfield set to 1 at one of the two points of the query segment and 0 everywhere else;

Y is one or more of the bitfield set to 1 at the other one of the two points of the query segment and 0 everywhere else.

D is one or more bit fields of the lines the identified one or more spatial segments belong to.

Figure 9:
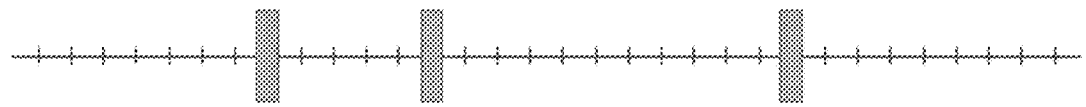
FIGS. 9, 10, 11, 12 and 13 show an example of step S90 of FIG. 1.

FIGS. 9 to 13 illustrate an example of the logical operation R=(X−1) NAND (Y−1) AND D. On FIG. 9 is represented a line that is sampled into spatial segments. The bit fields of the line is represented with values attributed to each segments. The values are set to "0". The segments that are intersected by a geometry of the 3D scene are set to 1, that is, the bits associated to the intersected spatial segments have been marked.

Figure 10:
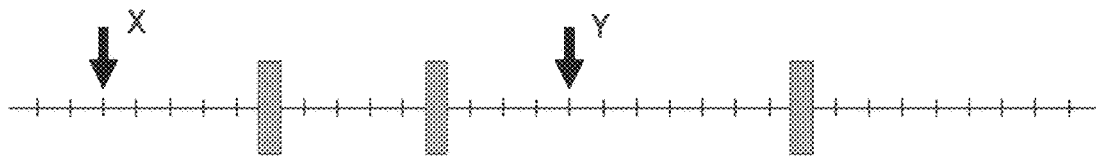
Figure 11:
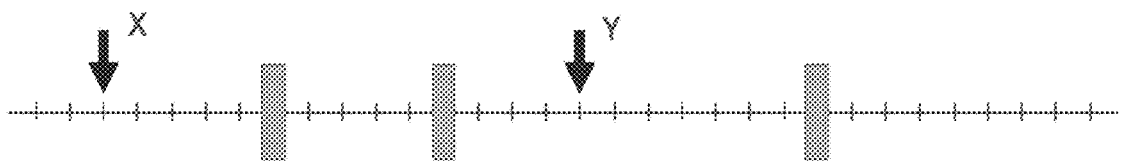
Figure 12:
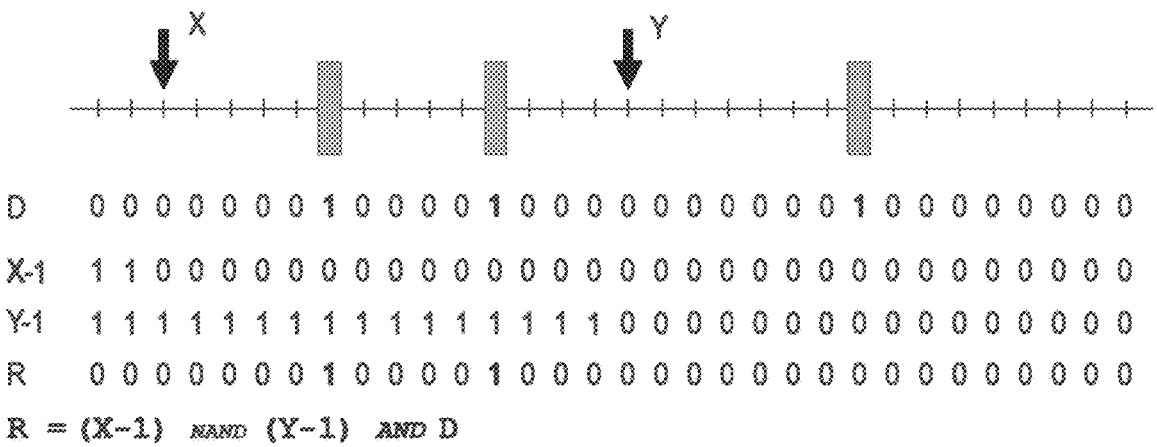

FIG. 10 shows the same line represented on FIG. 9. In FIG. 10, one segment X of the line has been identified as having the closest alignment with one of the two points of the query segment. A second segment Y of the line has been identified as having the closest alignment with the second one of the two points of the query segment. The respective bits of the spatial segments X and Y are marked, i.e. they value is set to "1". Then the inverse operation X−1 and Y−1 is performed, as illustrated on FIG. 11. The result R is computed, as shown in FIG. 12 where R is different from "0"; the points X and Y are not mutually visible.

Figure 13:
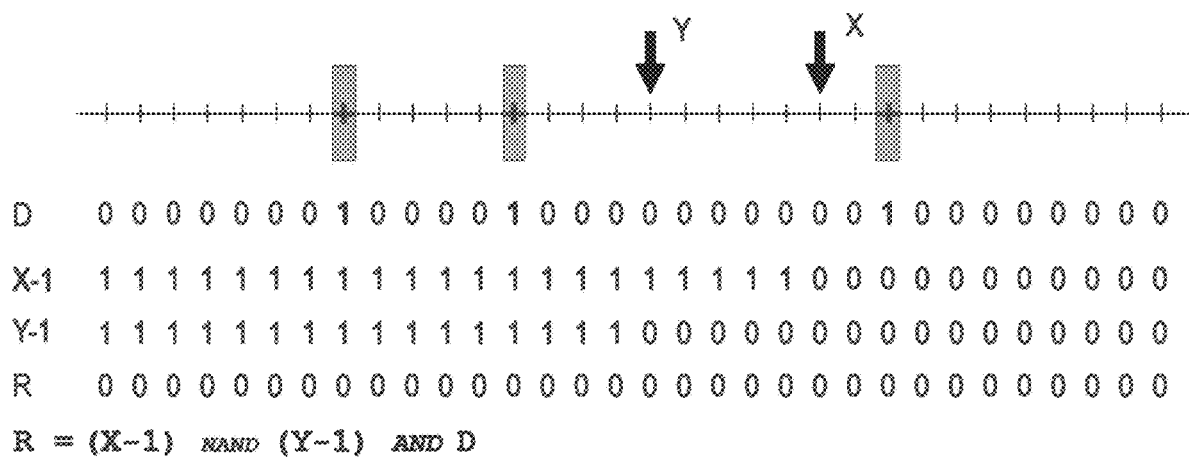

FIG. 13 illustrates another example of the logical operation R=(X−1) NAND (Y−1) AND D, where the R is equal to "0"; X and Y are mutually visible.

The number of visibility queries may be important. For instance, this is the case of the simulation of low frequency phenomenon. In examples, the number of queries may be decreased by subdividing the viewport in a set of superpixels. A superpixel is a group of contiguous pixels of the viewport. Two pixels are continuous if they share a common edge. In practice, the grouping is a square grouping of n×n pixels, where n is an integer number; for instance a square grouping of 8×8 neighbor pixels of the viewport. That way, because the superpixels are based on regular grid, superpixel neighbors can be reached in constant time.

Then, for each superpixel, one nor more clusters of pixels of the superpixel are computed. A cluster of pixels of a superpixel comprises pixels sharing one common pixel parameter. A pixel parameter characterizes a nature of the pixel such, but not limited to, its depth, normal, roughness, color, . . . . The creations of clusters is performed similarly to Olsson et. al. "*Clustered deferred and forward shading*". *In Proceedings of the Fourth ACM SIGGRAPH/Eurographics conference on High-Performance Graphics* (pp. 87-96). Eurographics Association.

For each cluster, a sample that represents an average value of at least one parameter of the pixels of the cluster is computed. The representative sample is thus "close" to every pixel inside the cluster. A reference of the computed sample is added to the superpixel from which the cluster has been computed. In an example, the barycentric position and average normal and material are used for computing the representative sample.

Then, the visibility query is computed with the samples instead of pixels. The visibility query is performed as already discussed in reference to S90. One iterates on each sample, then one iterates on each light which defines the set of visibility segments to be tested. Then, one RGB shading result is stored per representative sample; the result of step S90 is thus stored.

Then, the final image is reconstructed for every pixel of the viewport by computing, for each pixel of the viewport, a weighted sum of all the samples of the superpixel the pixel belongs to. The reconstruction is thus performed in a similar way as discussed in Kopf et al. "*Joint bilateral upsampling*". *In ACM Transactions on Graphics (ToG)* (Vol. 26, No. 3, p. 96), except that all samples of each superpixels are taking into account.

That way, the number of receivers is reduced, thus reducing the number of computation and so the efficiency of the pipeline. And thanks to the clustering strategy no details are lost on the shading. This is particularly visible on scene with highly varying geometry like fur, foliage or wire fences.

Figure 14:
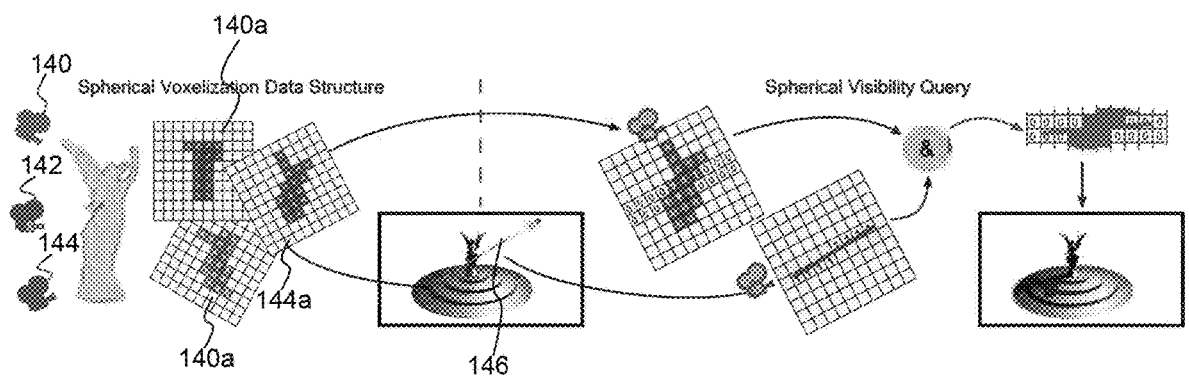
FIG. 14 shows an example of the pipeline of FIG. 1.

FIG. 14 illustrates an example of the pipeline of the method. A 3D scene is voxelized along a set of directions 140, 142, 144 and the result of the voxelization is stored in a texture array (also referred to as the shadow map or a compact bit field representation) by using a compact binary representation where the 1's stand for voxels owning geometry and 0's for empty ones 104a, 142a, 144a. Each pixel of the map thus stores the information whether a voxel (that is, a given parallel line of the set) intersects a geometry of the 3D scene. Each pixel of the map is linked to the bit field associated to the line the pixel represents.

Still in reference to FIG. 14, for a visibility query between two world space points 146, one searches among the vox-elization directions the one that is best aligned with the query segment and fetch the few pixels that store line projection. In the example of FIG. 14, the direction 144 is selected. Then, the bits corresponding to the line voxelization into the chosen point of view are located. Finally, the visibility query is answered in constant time by computing a bitwise logical "AND" between the line voxels and the fetched data. The two points are thus mutually visible only if the result of this operation is zero.

Hence, the present disclosure is very general, makes no assumption on the input scene, scales well on fine-grained parallel architectures, and appears as a good candidate for solving indirect visibility in global illumination simulations for large scenes. The present disclosure thus makes an good candidate for performing the visibility tests in a global pipeline for rendering the global illumination of a three-dimensional scene.

Especially, the present disclosure improves the global lighting pipeline that is disclosed in the document EP3211601A1, which is hereby incorporated by reference. Notably, the present disclosure can compute virtual point lights (VPLs) to pixel visibility test when the rendering is performed and uses the one or more direct light sources provided with the 3D scene for exploiting the computed VPLs.

The invention claimed is:

1. A computer-implemented method of computing of a visibility function of a three-dimensional (3D) scene, comprising:
   obtaining a set of directions ($\vec{\omega}$) in the 3D scene;
   for each direction of the set, computing a set of lines that are parallel to the direction;
   for each computed set of lines, sampling the lines of the set into spatial segments;
   associating each line of a set with a bit field, each spatial segment of the line corresponding to a bit of the bit field;
   superimposing the set of lines and the 3D scene;
   when a spatial segment of a line intersects a geometry in the 3D scene, marking the bit corresponding to the spatial segment of the bit field associated with the line;
   obtaining two points in the 3D scene that define a query segment;
   identifying one or more spatial segments having a closest alignment with the query segment; and
   computing the visibility of the query segment by performing a logical bit operation on one or more bit fields of the lines the identified one or more spatial segments belong to.

2. The computer-implemented method of claim 1, wherein performing a logical bit operation includes performing a logical bit for a segment [X Y] by computing a function R=(X−1) NAND (Y−1) AND D, where:
   X is one or more of the bitfield set to 1 at one of the two points of the query segment and to 0 everywhere else,
   Y is one or more of the bitfield set to 1 at the other one of the two points of the query segment and to 0 everywhere else, and
   D is one or more bit fields of the lines that the identified one or more spatial segments belong to.

3. The computer-implemented method of claim 2, wherein providing a set of directions in the 3D scene comprises quantizing a parametrization of a unit hemisphere ($\mathcal{H}$).

4. The computer-implemented method of claim 2, wherein the parallel lines computed for a direction ($\vec{\omega}$) are computed from a grid on a plane that is orthogonal to the direction.

5. The computer-implemented method of claim 1, wherein providing a set of directions in the 3D scene comprises quantizing a parametrization of a unit hemisphere ($\mathcal{H}$).

6. The computer-implemented method of claim 5, wherein quantizing a parametrization of a unit hemisphere ($\mathcal{H}$) includes performing an octahedral mapping of the hemisphere.

7. The computer-implemented method of claim 6, wherein the parallel lines computed for a direction ($\vec{\omega}$) are computed from a grid on a plane that is orthogonal to the direction.

8. The computer-implemented method of claim 5, wherein the parallel lines computed for a direction ($\vec{\omega}$) are computed from a grid on a plane that is orthogonal to the direction.

9. The computer-implemented method of claim 1, wherein the parallel lines computed for a direction ($\vec{\omega}$) are computed from a grid on a plane that is orthogonal to the direction.

10. The computer-implemented method of claim 9, wherein the grid on the plane is a regular grid and wherein the grid is the same for each plane orthogonal to each direction.

11. The computer-implemented method of claim 10, further comprising:
computing, for each plane, local basis for defining the position of the grid on the plane, the local basis comprising a first vector that is obtained from the direction ($\vec{\omega}$), a second vector ($\vec{e_u}$) and third vector ($\vec{e_v}$) that are the local basis of the plane.

12. The computer-implemented method of claim 9, further comprising:
computing, for each plane, local basis for defining the position of the grid on the plane, the local basis comprising a first vector that is obtained from the direction ($\vec{\omega}$), a second vector ($\vec{e_u}$) and third vector ($\vec{e_v}$) that are the local basis of the plane.

13. The computer-implemented method of claim 12, wherein the second vector ($\vec{e_u}$) and the third vector ($\vec{e_v}$) are continuous dependence on the direction ($\vec{\omega}$).

14. The computer-implemented method of claim 13, wherein the continuous dependence on the direction ($\vec{\omega}$) is given by:

$$\forall \vec{\omega}=(x,y,z)\in \mathcal{H}, \text{ ie, } x^2+y^2+z^2=1 \text{ and } z\geq 0$$

$$\mathcal{F}(\vec{\omega}) = (\vec{e_w},\vec{e_v}) = \left( \begin{pmatrix} 1-\dfrac{x^2}{1+z} \\ \dfrac{-xy}{1+z} \\ -x \end{pmatrix}, \begin{pmatrix} \dfrac{-xy}{1+z} \\ 1-\dfrac{y^2}{1+z} \\ -y \end{pmatrix} \right)$$

where $\mathcal{H}$ is a unit hemisphere;

$\mathcal{F}$ defines a tangential space for a given direction ($\vec{\omega}$);

(x,y,z) are coordinates in the basis of the unit hemisphere.

15. The computer-implemented method of claim 1, wherein identifying one or more spatial segments having a closest alignment with the query segment includes:
determining a closest direction among the set of directions;
determining the plane associated with the determined closest direction;
projecting the query segment on the determined plane; and
determining the closest lines to the projected query segment.

16. The computer-implemented method of claim 15, wherein each line of a computed set of lines of a provided direction is a pixel on the plane that is orthogonal to the direction, the set of lines of the provided direction forming a grid of pixels on the plane, and
wherein determining the closest lines to the projected query segment includes determining the pixels of the plane that are intersected by the projected query segment, projected query segment forming a set of contiguous pixels on the plane.

17. The computer-implemented method of claim 15, wherein determining the closest direction among the set of directions includes:
computing a direction of the query segment and computing the position of the segment in the parametrization of the unit hemisphere ($\mathcal{H}$); and
selecting a direction among the set of directions which is the closest to the position of the segment in the parametrization of the unit hemisphere ($\mathcal{H}$).

18. The computer-implemented method of claim 1, further comprising, before providing a query segment:
subdividing the viewport in a set of superpixels, a superpixel being a group of contiguous pixels of the viewport;
for each superpixel, computing one nor more clusters of pixels of the superpixel, each computed cluster comprising pixels having one common pixel parameter;
for each cluster, computing a sample that represents an average value of at least one parameter of the pixels of the cluster, and adding a reference of the computed sample to the superpixel from which the cluster has been computed; and
further comprising, after the computation of the visibility of the segment query:
reconstructing the final image for every pixels of the viewport by computing, for each pixel of the viewport, a weighted sum of all the samples of the superpixel the pixel belongs to.

19. A non-transitory computer readable medium storing thereon a computer program comprising instructions for performing a computer-implemented method of computing of a visibility function of a three-dimensional (3D) scene, the method comprising:
obtaining a set of directions ($\vec{\omega}$) in the 3D scene;
for each direction of the set, computing a set of lines that are parallel to the direction;
for each computed set of lines, sampling the lines of the set into spatial segments;
associating each line of a set with a bit field, each spatial segment of the line corresponding to a bit of the bit field;
superimposing the set of lines and the 3D scene;
when a spatial segment of a line intersects a geometry in the 3D scene, marking the bit corresponding to the spatial segment of the bit field associated with the line;

obtaining two points in the 3D scene that define a query segment;

identifying one or more spatial segments having a closest alignment with the query segment; and computing the visibility of the query segment by performing a logical bit operation on one or more bit fields of the lines the identified one or more spatial segments belong to.

20. A system comprising:

a processor coupled to a memory and a graphical card with a graphics processing unit (GPU), the memory having recorded thereon a computer program comprising instructions for computing of a visibility function of a three-dimensional (3D) scene that when executed by the processor causes the processor to be configured to:

obtain a set of directions ($\vec{\omega}$) in the 3D scene;

for each direction of the set, compute a set of lines that are parallel to the direction;

for each computed set of lines, sample the lines of the set into spatial segments;

associate each line of a set with a bit field, each spatial segment of the line corresponding to a bit of the bit field;

superimpose the set of lines and the 3D scene;

when a spatial segment of a line intersects a geometry in the 3D scene, mark the bit corresponding to the spatial segment of the bit field associated with the line;

obtain two points in the 3D scene that define a query segment;

identify one or more spatial segments having a closest alignment with the query segment; and compute the visibility of the query segment by performing a logical bit operation on one or more bit fields of the lines the identified one or more spatial segments belong to.

* * * * *